(12) United States Patent
Chesson et al.

(10) Patent No.: US 6,634,065 B2
(45) Date of Patent: Oct. 21, 2003

(54) RETAINER CLIP FOR ATTACHING COMPONENTS TO A BELT MOLDING

(75) Inventors: Geoffrey A. Chesson, Barrie (CA); Gerald Y. Ruppert, Wixom, MI (US); Steven D. Haar, Columbus, MI (US)

(73) Assignee: Decoma Exterior Trim, Inc., Concord (CA)

( * ) Notice: Subject to any disclaimer, the term of this patent is extended or adjusted under 35 U.S.C. 154(b) by 0 days.

(21) Appl. No.: 09/962,873

(22) Filed: Sep. 25, 2001

(65) Prior Publication Data

US 2002/0073518 A1 Jun. 20, 2002

Related U.S. Application Data

(60) Provisional application No. 60/256,608, filed on Dec. 19, 2000.

(51) Int. Cl.[7] .................. A44B 21/00; F16B 13/00; G06C 7/02
(52) U.S. Cl. .................. 24/289; 24/293; 24/297; 24/295; 235/145 R; 411/508
(58) Field of Search .................. 24/289, 297, 293, 24/295; 411/508

(56) References Cited

U.S. PATENT DOCUMENTS

| | | | | | |
|---|---|---|---|---|---|
| 4,066,285 | A | * | 1/1978 | Hall et al. | 293/62 |
| 4,594,481 | A | * | 6/1986 | Wilham et al. | 200/5 A |
| 4,698,882 | A | * | 10/1987 | Lang | 24/289 |
| 4,949,507 | A | * | 8/1990 | Vaughan | 49/482 |
| 5,160,832 | A | * | 11/1992 | Hubert et al. | 235/145 R |
| 5,202,172 | A | * | 4/1993 | Graf | 24/297 |
| 5,207,027 | A | * | 5/1993 | Larsen | 49/482.1 |
| 5,353,571 | A | * | 10/1994 | Berdan et al. | 52/716.5 |
| 5,564,249 | A | * | 10/1996 | Borys et al. | 52/716.5 |
| 5,816,733 | A | * | 10/1998 | Ishikawa et al. | 24/293 |

* cited by examiner

Primary Examiner—Victor Sakran
(74) Attorney, Agent, or Firm—Clark Hill PLC

(57) ABSTRACT

A retainer clip receives a keypad and the like on a beltline molding. The clip has a face plate having a plurality of apertures. A wall extends from the face plate. The wall has a plurality of tangs spaced thereabout. The wall is configured to be received within an aperture in the beltline molding. The wall is sized to position the face plate in the aperture of the beltline molding. The tangs cooperate with the beltline molding to retain the faceplate to the beltline molding. The wall and keypad are configured to snappingly engage each other.

10 Claims, 4 Drawing Sheets

RETAINER CLIP FOR ATTACHING COMPONENTS TO A BELT MOLDING

RELATED APPLICATION

This application claims priority to and all the benefits of U.S. provisional patent application No. 60/256,608, filed on Dec. 19, 2000.

FIELD OF INVENTION

This invention relates to a retainer clip for attaching components to a belt molding. In particular, this invention relates to a retainer clip for attaching a keypad or the like to a belt molding.

BACKGROUND OF INVENTION

The Ford Explorer is available with a keyless entry system. A keypad is provided on the door, near the door handle. The keypad is operatively connected to a processor which is connected to the door lock. When the operator keys in the correct code, the doors unlock. U.S. Pat. No. 4,205,325 describes a typical system.

In most applications, the keypad is mounted either to the upper region of the outer door panel or to the housing surrounding the door handle. The upper region of the door panel is preferred over the door handle housing since the upper door region presents a better aesthetic and ergonomic position. However, the upper door region requires an aperture to be punched in the outer door panel. If molds already exist for stamping the door panel, then adding the additional punching operation can only be accomplished at considerable cost. Thus, the introduction of a keyless entry system has been limited to new vehicle designs.

A logical location for the keypad would be on the beltline weatherstrip or molding. The weatherstrip usually comprises a rigid substrate coated with a polymer. Examples of beltline weatherstrips are described in U.S. Pat. Nos. 5,435,865; 5,564,249; and 5,605,736. However, there is a very limited volume available in this region of the door. The inner and outer door panels are converging together while leaving an opening through which the window pane extends. Heretofore, the beltline weatherstrip has not been used as a location for mounting the keypad of the keyless entry system.

SUMMARY OF INVENTION

The disadvantages of the prior art may be overcome by providing a retainer clip for attaching a keypad or the like to a belt molding.

It is desirable to provide a retainer clip for receiving a keypad and the like. The clip has a face plate having a plurality of apertures. A wall extends from the face plate. The wall has a plurality of tangs spaced thereabout. The wall is configured to be received within an aperture in a beltline molding. The wall is sized to position the face plate in the aperture of the beltline molding. The tangs cooperate with the beltline molding to retain the faceplate to the beltline molding. The wall is configured to snappingly receive the keypad.

It is further desirable to provide in combination, a beltline molding, a retainer clip and a keypad. The beltline molding has a U-shaped rigid member having an aperture. The retainer clip has a face plate having a plurality of apertures. A wall extends from the face plate. The wall has a plurality of tangs spaced thereabout. The wall is configured to be received within the aperture in the beltline molding and sized to position the face plate therein. The tangs cooperate with the beltline molding to retain the faceplate thereto. The keypad has a plurality of buttons. The keypad engages the wall positioning the buttons within the apertures of the retainer clip.

DESCRIPTION OF THE DRAWINGS

In drawing which illustrate an embodiment of the present invention.

DESCRIPTION OF THE INVENTION

Figure 1:
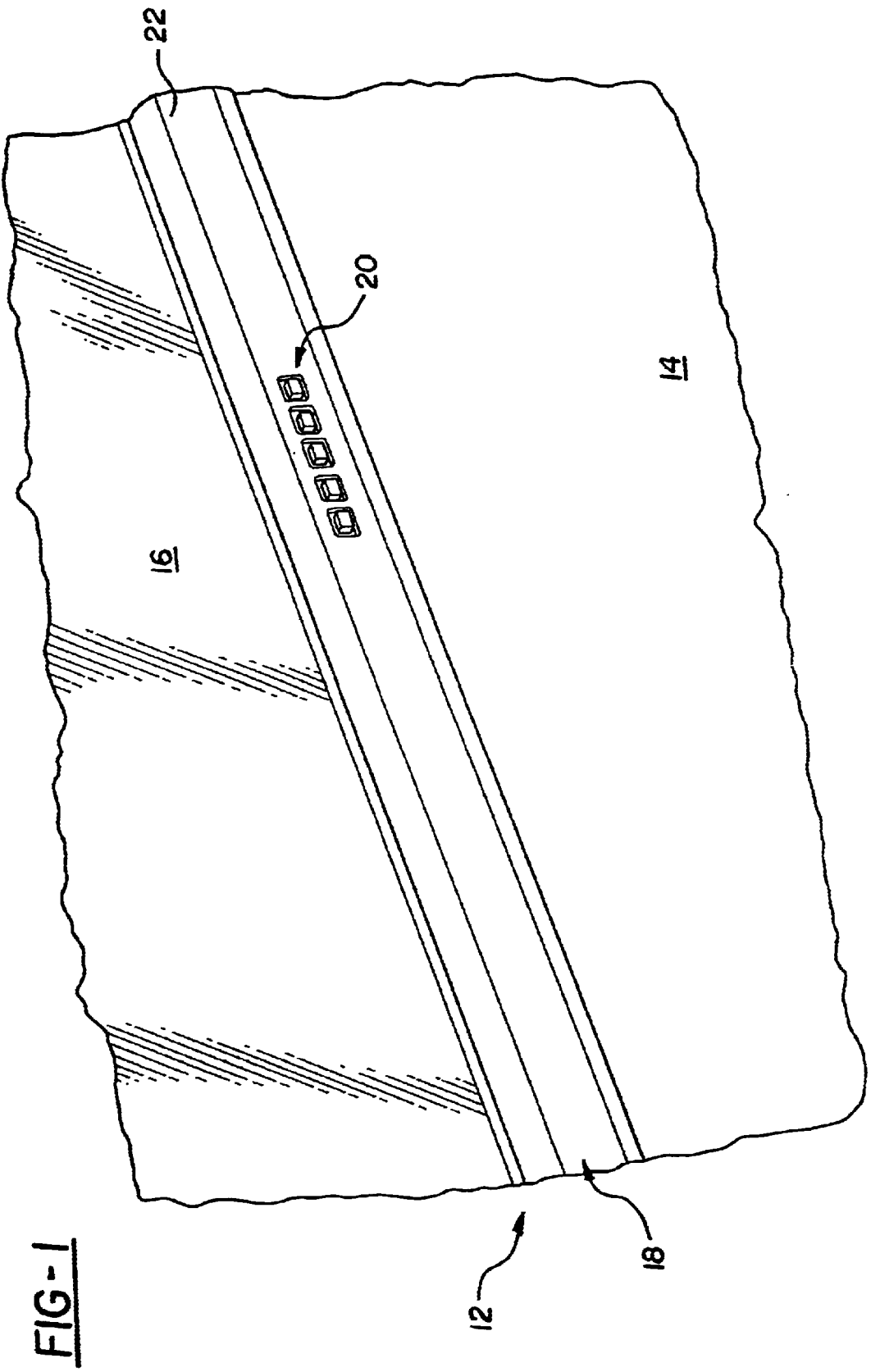
FIG. 1 is a perspective view of a door assembly having a keypad mounted according to the present invention.
Figure 2:
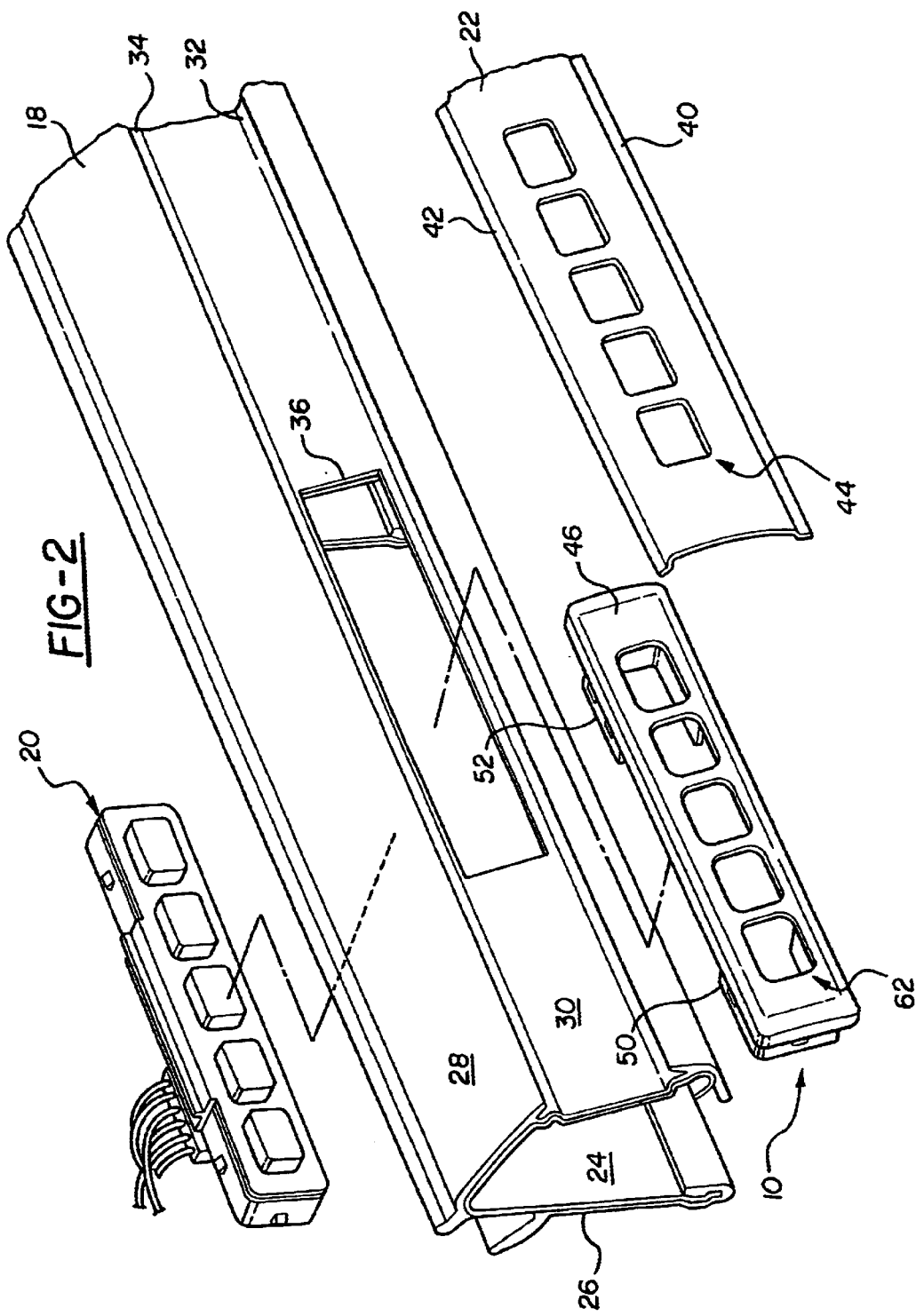
FIG. 2 is an exploded perspective view of the retainer clip of the present invention in combination with a beltline molding, a cover plate and a keypad.

Referring to FIGS. 1 and 2, a door assembly 12 is illustrated. The door assembly 12 has an outer door panel 14, a translating window 16, a beltline weatherstrip or molding 18, and a keypad 20 mounted utilizing a retainer clip 10 according to the present invention. Beltline molding 18 preferably has a cover piece 22 which cooperates with the keypad 20.

Beltline molding 18 has rigid U-shaped core 24 and polymeric layers 26 and 28. Beltline molding 18 is preferably co-extruded as is well known in the art. The outer arm of the core 24 has a longitudinally extending recess 30 having opposed grooves 32, 34 extending on upper and lower edges of the recess 30. Recess 30 has a rectangular aperture 36. The inner arm of core 24 has a rectangular cut-out 38 in the region of the rectangular aperture 36.

Cover piece 22 is generally elongate having a length approximately the same as the beltline molding 18. Cover piece 22 has a uniform generally arcuate cross-section. Opposite edges 40, 42 of the cover piece 22 are flared to cooperate with grooves 32, 34, respectively in a sliding fit. The cover piece 22 has a series of spaced apertures 44.

Cover piece 22 preferably is inserted into the grooves 32, 34 at one end of the beltline molding 18 and then slid down the length thereof until the cover piece 22 is co-extensive with the beltline molding 18 and apertures 44 is aligned with the aperture 36. The arcuate extent of the cover piece 22 will match the contour of the outer surface of the core 24.

Figure 3:
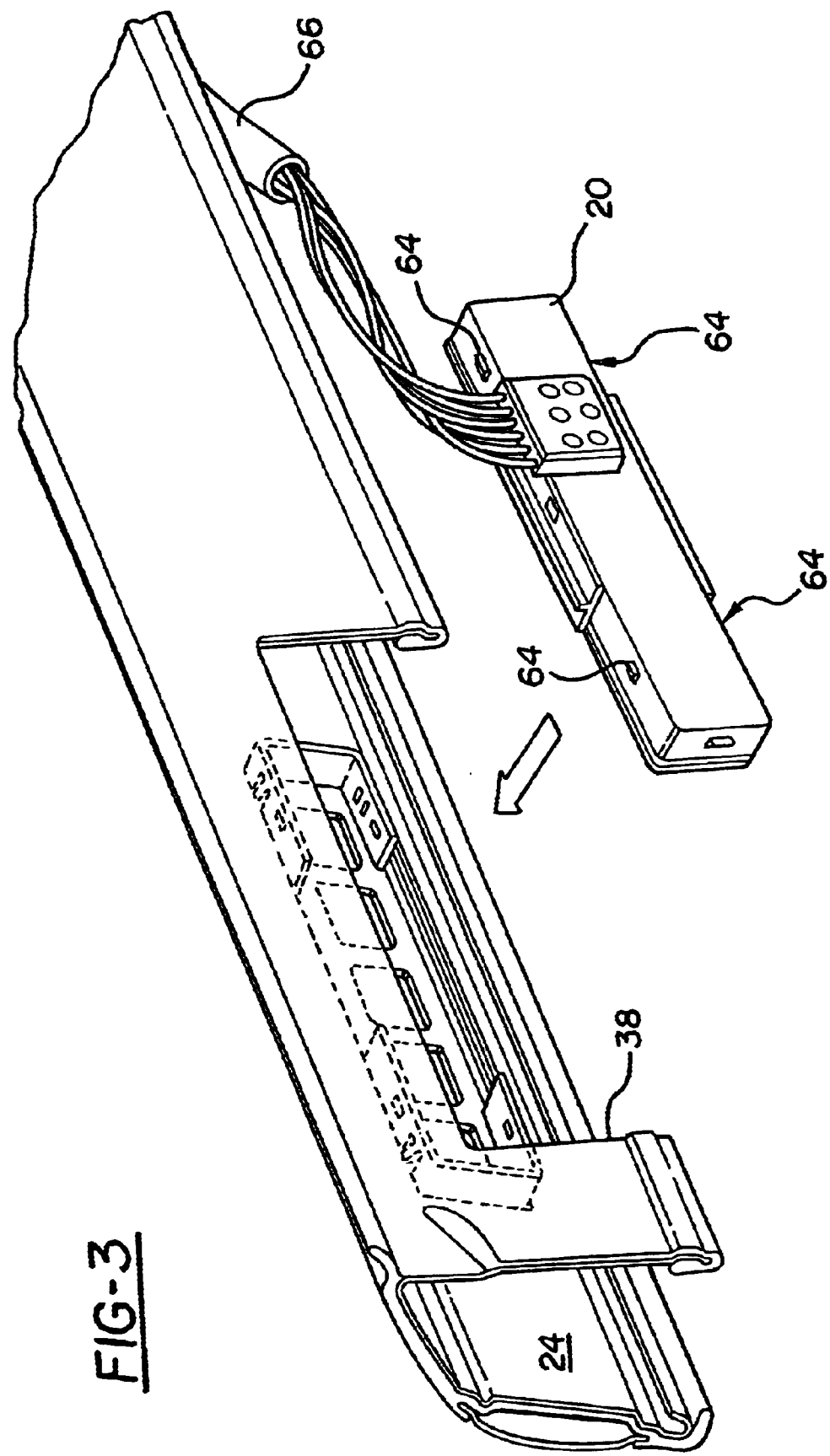
FIG. 3 is an exploded reverse perspective view of the retainer clip installed on a beltline molding.
Figure 4:
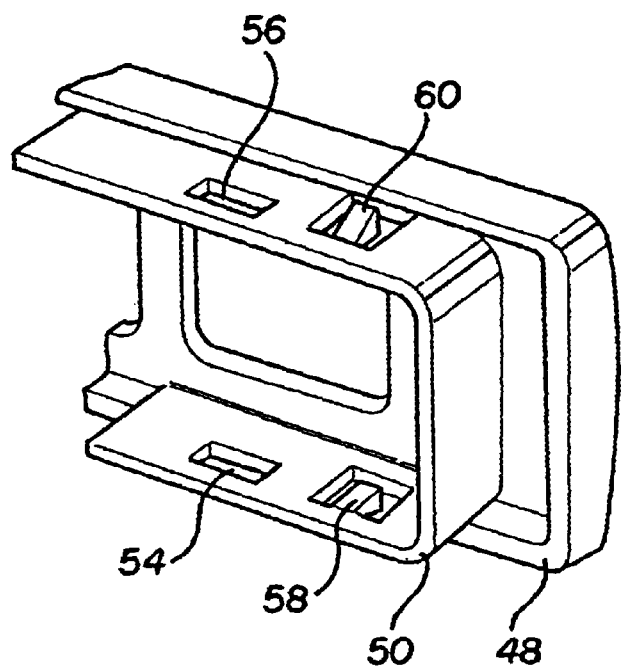
FIG. 4 is partial perspective view of a retainer clip of the present invention.
Figure 5:
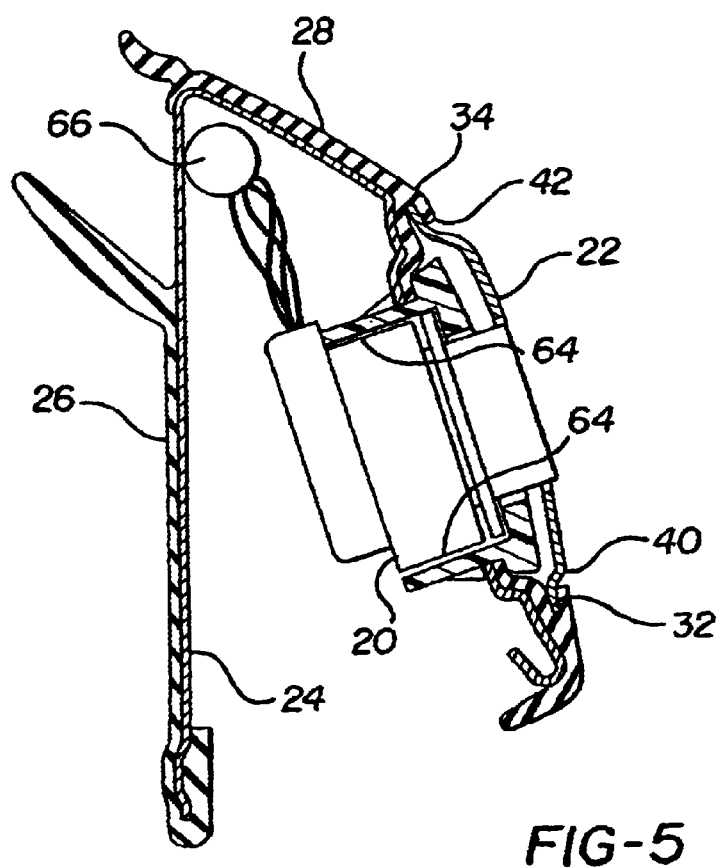
FIG. 5 is a side sectional view of a keypad installed on a beletline molding utilizing the retainer clip of the present invention.

Referring to FIGS. 2, 3 and 4, retainer clip 10 has face plate 46 having a flange 48 which extends about the periphery of and perpendicular to the face plate 46. Spaced inwardly of the periphery of the face plate 46 are U-shaped walls 50, 52. The end portions of the walls 50, 52 are spaced apart to be inserted through aperture 36 of beltline molding 18. Side portions of the walls 50, 52 have apertures 54, 56 which are spaced from the end portions. Side portions of the walls 50, 52 have tangs 58, 60 which extend outwardly to cooperate with flange 48. Face plate 46 has a series of apertures 62.

Walls 50, 52 are illustrated as being separate. It is apparent to those skilled in the art that walls 50, 52 could be continuous or further discontinuous provided the walls complementarily fit about the keypad 20.

As illustrated in FIG. 3, the retainer clip 10 is presented to the beltline molding 18 by inserting the walls 50, 52 into the aperture 36. Tangs 58, 60 flex allowing insertion of the walls 50, 52 into the aperture 36, but once inserted, the tangs 58, 60 snap outwardly and prevent removal of the retainer clip 10.

Preferably, retainer clip 10 is injection molded from an organic plastic material.

Keypad 20 has a generally rectangular outline sized to snappingly engage with retainer clip 10. Keypad 20 has a series of tabs 64 which are positioned to engage with apertures 54, 56 of retainer clip 10. Keypad 20 is presented from the inner side of the beltline molding 18 until the tabs 64 snappingly engages the retainer clip 10 and the buttons 68 extend through apertures 62 and 44. The electrical wire harness 66 can be conveniently stored in the bight portion of the core 24 of the beltline molding 18.

It is apparent to those skilled in the art that the tabs 64 could be molded on the retainer clip 10 and the housing of the keypad 20 be provided with complementary recesses enabling the keypad 20 to snappingly engage the retainer clip 10. Further, if the keypad has a single button surface rather than discrete buttons, apertures 62, 44 will correspond with the form of buttons of the keypad.

The depth of the body of the keypad 20 is the limiting factor in utilizing the retainer clip 10 of the present invention. The depth of the body of the keypad 20 must fit within the available volume between the beltline molding 18 and the outer panel 14 of the door assembly 12. However, the retainer clip 10 does add to the depth of the keypad 20 and therefore does not restrict the installation of the keypad 20 on the beltline molding 18.

The present invention has been described with a keypad. However, it is within the purview of the present invention that other components may be substituted for the keypad.

The above-described embodiment of the invention is intended to be an example of the present invention and alterations and modifications may be effected thereto, by those of skill in the art, without departing from the scope of the invention.

What is claimed:

1. A retainer clip for attaching a keypad to a beltline molding, said clip comprising:
    a face plate having at least one aperture, and
    a wall extending generally perpendicular from said face plate and defining outer side portions about the periphery thereof, said wall having a plurality of tangs extending outwardly from said side portion and spaced thereabout, said wall configured to be received within an aperture in the beltline molding and sized to position said face plate therein, said tangs cooperating with the beltline molding to retain said faceplate thereto, and said wall and keypad are configured to snappingly engage each other.

2. A retainer clip as set forth in claim 1 further including a flange extending about the periphery of and perpendicular to said face plate, said flange extending generally parallel to said wall.

3. A retainer clip as set forth in claim 2 wherein said wall includes a pair of U-shaped walls spaced inwardly of the periphery of said face plate to be received within the aperture of the beltline molding.

4. A retainer clip as set forth in claim 3 further including a plurality of apertures extending through said side portions of said walls adjacent said tangs for cooperation with the keypad.

5. A retainer clip as set forth in claim 4 further including a plurality of apertures spaced apart along the said face plate for receiving a portion of the keypad therethrough.

6. In combination,
    a beltline molding comprising a U-shaped rigid member having an aperture;
    a retainer clip comprising a face plate having at least one aperture, and a wall extending generally perpendicular from said face plate and defining outer side portions about the periphery thereof, said wall having a plurality of tangs extending outwardly from said side portion and spaced thereabout, said wall configured to be received within an aperture in said beltline molding and sized to position said face plate therein, said tangs cooperating with said beltline molding to retain said faceplate thereto; and
    a keypad having at least one button, said keypad engaging said wall positioning said button within said aperture of said retainer clip.

7. The combination as set forth in claim 2 wherein said retainer clip further includes a flange extending about the periphery of and perpendicular to said face plate, said flange extending generally parallel to said wall.

8. The combination as set forth in claim 7 wherein said wall includes a pair of U-shaped walls spaced inwardly of the periphery of said face plate to be received within said aperture of said beltline molding.

9. The combination as set forth in claim 8 wherein said retainer clip further includes a plurality of apertures extending through said side portions of said walls adjacent said tangs and said keypad includes a plurality of tabs received with said apertures to snappingly interconnect said keypad to said retainer clip.

10. The combination as set forth in claim 9 wherein said keypad includes a plurality of spaced apart buttons and said retainer clip includes a plurality of apertures spaced apart along the said face plate for receiving said buttons of said keypad therethrough.

* * * * *

UNITED STATES PATENT AND TRADEMARK OFFICE
CERTIFICATE OF CORRECTION

PATENT NO. : 6,634,065 B2
DATED : October 21, 2003
INVENTOR(S) : Chesson et al.

It is certified that error appears in the above-identified patent and that said Letters Patent is hereby corrected as shown below:

<u>Column 4,</u>
Line 15, delete "the" before "said".
Line 51, delete "the" before "said face plate".

Signed and Sealed this

Sixteenth Day of March, 2004

JON W. DUDAS
*Acting Director of the United States Patent and Trademark Office*